Figure 1:
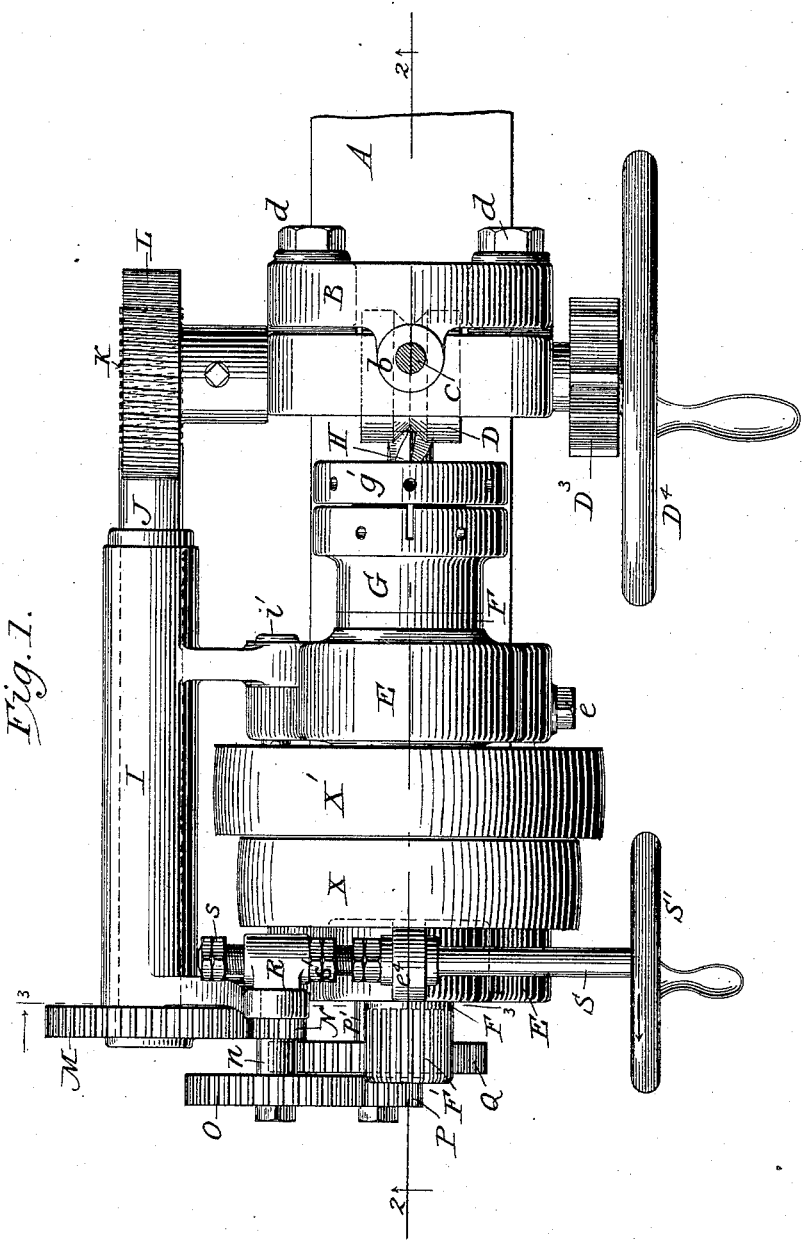

(No Model.)  3 Sheets—Sheet 1.

R. P. FRIST.

APPARATUS FOR MAKING CYLINDRICAL RODS OF PARCHMENTIZED FIBER.

No. 469,238. Patented Feb. 23, 1892.

Witnesses

Inventor
Robert P. Frist
by his attorneys
Baldwin Davidson & Wight

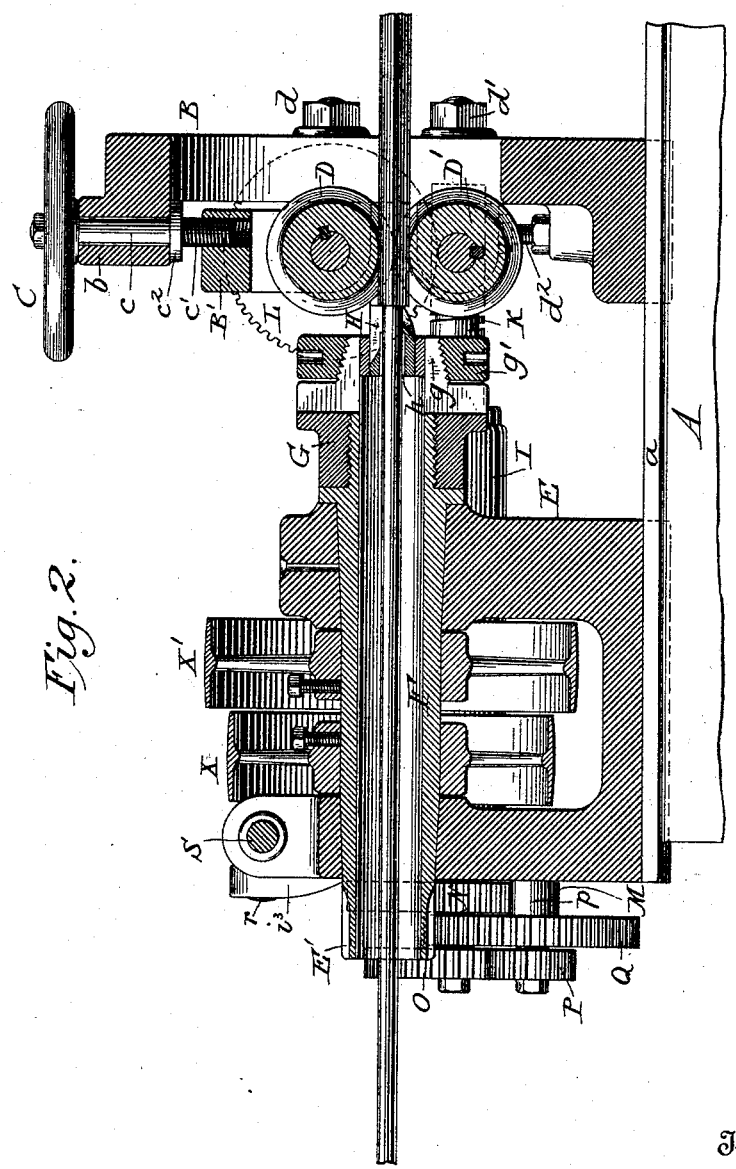

(No Model.) 3 Sheets—Sheet 3.
R. P. FRIST.
APPARATUS FOR MAKING CYLINDRICAL RODS OF PARCHMENTIZED FIBER.
No. 469,238. Patented Feb. 23, 1892.
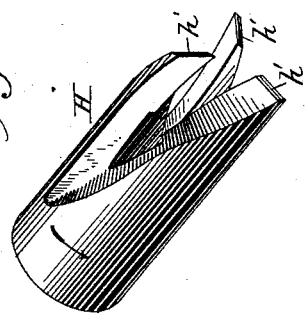
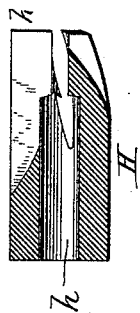
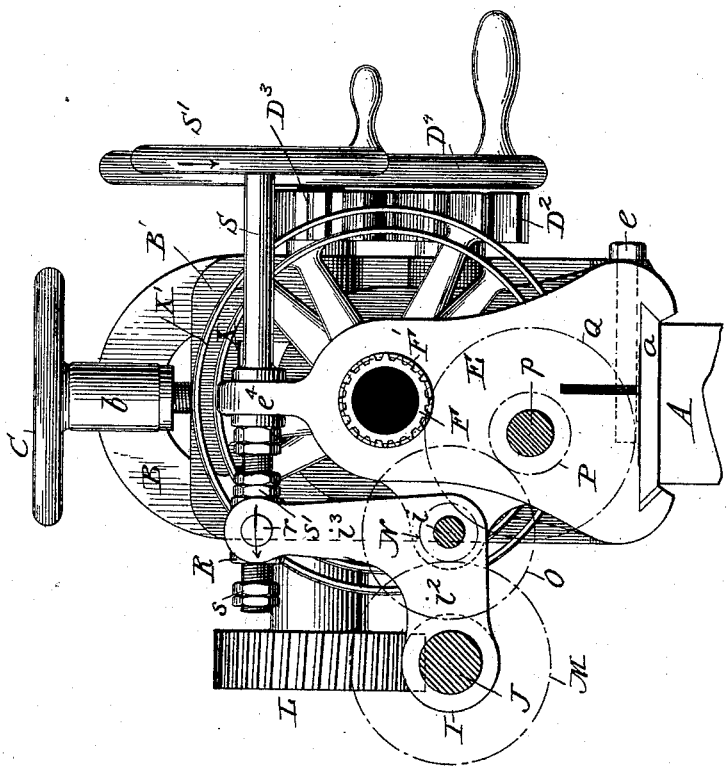
Witnesses
Sidney P. Hollingsworth
P. Washington Miller
Inventor
Robert P. Frist
by Baldwin Davidson & Wright
Attorneys

UNITED STATES PATENT OFFICE.

ROBERT PORTER FRIST, OF WILMINGTON, DELAWARE, ASSIGNOR TO THE DELAWARE HARD FIBRE COMPANY, OF SAME PLACE.

APPARATUS FOR MAKING CYLINDRICAL RODS OF PARCHMENTIZED FIBER.

SPECIFICATION forming part of Letters Patent No. 469,238, dated February 23, 1892.

Application filed July 20, 1891. Serial No. 400,152. (No model.)

*To all whom it may concern:*

Be it known that I, ROBERT PORTER FRIST, a citizen of the United States, residing at Wilmington, in the county of New Castle and State of Delaware, have invented certain new and useful Improvements in Apparatus for Making Cylindrical Rods of Parchmentized Fiber, of which the following is a specification.

Parchmentized or vulcanized fiber is well known to be a material possessing many distinguishing characteristics and peculiar properties. It is formed, for instance, of partially consolidated or amalgamated superimposed laminæ, which tend to separate under the action of a cutting-tool operating crosswise and edgewise thereon. This fiber is, moreover, very hard and more destructive even than steel on the cutting-tools. The friction of cutting or turning this material generates heat sufficient even to burn off the edges of thin cutting-tools, as well as the fabric itself, which also expands under heat. It is also pliable, and a piece only a few inches long will bend under a slight lateral pressure. For these and other reasons it is necessary that the tool should have a broad cutting-surface, that it should be revolved comparatively slowly, that the rod should be firmly clamped close to the cutter, that the cutting-tool should act simultaneously on opposite sides of the rod to counteract and obviate lateral deflection, that the cutting should proceed progressively from end to end, that the rod should be accurately guided while being cut, and that its finished end should be unclamped and free from torsion.

United States Letters Patent No. 424,876, granted to me April 1, 1890, reissued June 30, 1891, as No. 11,173, show a method of and tool for producing rods of parchmentized fiber complying with the above-mentioned requirements.

My present improvements relate to an improved organization of instrumentalities for producing such rods. The subject-matter claimed is hereinafter specified. The feed end of the machine I term the "front;" the opposite, the "rear" end. That side on the right of a person facing the feed end I term the "right" or "rear" side; the opposite, the "front" or "left" side.

The accompanying drawings represent so much only of the apparatus as is necessary to illustrate the subject-matter claimed. Unless otherwise specified the parts are of usual approved construction and operation.

Figure 1 represents a plan or top view, and Fig. 2 a vertical longitudinal central section through the apparatus on the line 2 2 of Fig. 1, looking to the right. Fig. 3 is a rear elevation, partly in section, on the line 3 3 of Fig. 1, looking forward; Fig. 4, a view of the cutting-tool detached, and Fig. 5 a vertical longitudinal central section therethrough.

A bed-plate or slide-rest A supports a housing B, adjustable longitudinally thereon and adapted to be securely clamped thereto. The top of this housing or frame is arched and provided with an overhanging boss $b$ at its top, in which turns a stem $c$, carrying a hand-wheel C on its upper end and a screw $c'$ at the bottom. A collar $c^2$ underneath the boss, in conjunction with the hand-wheel, while preventing end-play and permitting the stem to turn freely, holds it securely in place. The rod-blank passes endwise to the cutters between feed-rolls D D', mounted in suitable bearings in the housing. The upper roll D is mounted in a bearing-block B', raised and lowered by the screw-stem and hand-wheel above described and clamped securely in its adjusted position by bolts $d$. The lower roll D' is mounted in bearing-blocks raised and lowered by screws $d^2$ and clamped in its adjusted position by bolts $d'$.

A head-stock E is adapted to slide longitudinally on the shears $a$ of the bed and to be secured in its desired position by a set-screw $e$. A tubular spindle F, provided with the usual taper bearings to compensate wear, is mounted longitudinally in the head-stock and carries on its inner or forward end a screw-thread to receive a suitable clutch G, in which the cutting-tool H is secured. The front end of the tubular clutch G is provided with a tapering longitudinally-slotted screw-stem $g$, on which a ring $g'$ screws to clamp the cutting-tool in the bore of the spindle.

The cutting-tool H consists of a longitudinally-perforated cylindrical or slightly-tapering stock, the front portion of which is cut away to form a series of chisel-edged cutters $h'$. The direction of rotation of these cutters is indicated by the arrow in Fig. 4, and their peculiar formation is illustrated in the drawings, being that which experience has demonstrated to be the most efficient in practice. The cutting is done by the front ends of the cutters, the inner surfaces of which are curved to conform to the curvature of the rod to be cut. The organization of the clutch is such as to permit of the ready insertion or removal of the tool to suit rods of different diameters. A counterbore $h$ is formed in the tool just back of the cutting-surface to accommodate the enlargement of the rod caused by the heat generated by the cutting or turning action, thus preventing the clamping and torsion of the rod in the bore of the cutter which might otherwise take place. A longitudinal sleeve I on the rear side of the frame is pivoted at $i\ i'$ to the head-stock E and carries a shaft J, on the forward end of which is a screw K, meshing with a worm-wheel L on the shaft of the upper feed-roll D. The opposite or rear end of this screw-shaft carries a gear-wheel M, meshing with a pinion N on a shaft $n$, which carries a gear-wheel O, driven by a pinion P on the same shaft $p$, with a gear-wheel Q, meshing with a pinion F' on the spindle F. The spindle and cutter are driven from any suitable prime mover at a proper rate of speed by a band encircling one of the pulleys X X'. I have found in practice a speed of a hundred and fifty revolutions per minute, or thereabout, to produce the best results. The rod is fed to the cutters between the rollers much more slowly by the reducing-gear above described, which speed may be varied by changing the gear-wheels, as usual in back-geared lathes.

The feed-rolls may be operated by hand when desired by means of intermeshing pinions $D^2 D^3$, mounted on their respective shafts. The shaft of the upper roll opposite the worm-wheel L carries a hand-wheel $D^4$ for actuating the rolls when required.

To disengage the power-feed gear one of the bearing-arms $i^2$ of the screw-shaft J is extended upward, constituting an elbow or bell-crank lever $i^3$, rocking on a pivot $i$ on the head-stock, as above described. A screw-block R, rocking on a pivot $r$ in this elbow-lever, carries a screw-shaft S, provided with jam-nuts $s\ s'$, which limit the movements of this block. An ear $e^4$ on top of the rear end of the head-stock forms a bearing for the shaft S, which is prevented from end-play by suitable collars thereon on opposite sides of the ear. The shaft is turned when desired by a hand-wheel S'. Turning it to the left or backward, as shown by the arrow in Fig. 1, causes the upper end of the elbow-lever $i^3$ to move outward or backward, as shown by the arrow in Fig. 3, thus lowering the screw-shaft J out of contact with the worm-wheel L.

In moving the power-feed gear into and out of engagement only a slight movement of the shaft J is necessary. The arm $i^3$ moves through a short arc of long radius, and no special provision has to be made for compensating the difference in the distance between the axis of the pivot $i$ and the position of the nut when at different parts of the screw-shaft.

In practice the connections between the parts are made somewhat loose, and this compensates any variation or strain that might occur. A reverse movement restores the connection of these parts. When disengaged, as above described, the rolls can be run either backward or forward by the hand-gear above mentioned.

The rods are preferably turned from rectangular or polygonal bars of fiber of suitable size and length. The feed-rolls are provided with transverse or annular V-shaped grooves in the line of the bore of the cutting-tool and spindle, the cutting-tool being adjusted as close to the rolls as practicable. The rod-blank or bar is clamped and fed forward endwise between the rolls to the cutters, the front edges of which cut away its exterior, reducing it to the desired cylindrical form. The finished end of the rod enters the bore of the cutter, which conforms in shape to it, and thus it keeps it in accurate alignment during the cutting operation. The finished portion of the rod then passes backward through the counterbored portion of the cutter and through the spindle, the bore of which is preferably made of larger diameter than the rod, so as to leave it free, as I find that when the rod approximates the size of the bore the rapid rotation of the spindle tends to twist the rod, so that it is preferable to leave it perfect freedom of movement at the discharge end.

I am of course aware that my apparatus resembles in some respects lathes in ordinary use; but my improved organization enables me to produce perfectly-cylindrical rods of parchmentized fiber of very small diameter, which it would be impossible to produce with such ordinary lathes.

Having thus fully described the construction, organization, and operation of my improved apparatus for making cylindrical rods of parchmentized fiber, what I claim therein as new and as of my own invention is—

1. The cutting-tool hereinbefore described, consisting of the combination of the tubular stock, the chisel-shaped cutters formed by reducing its front edge, their inner faces or back edges nearest the rod concentrically curved to conform thereto, and the counterbore intersecting the cutters, so as to increase the bore at their back portions.

2. The combination, substantially as hereinbefore set forth, of the tubular spindle, the clutch carried thereby, the tapering screwed stem on the clutch, the clamping-ring screwed thereon, and the tubular counterbored chisel-ended cutter-stock carried thereby.

3. The combination, substantially as hereinbefore set forth, of the annularly-grooved feed-rollers, the head-stock adapted to be adjusted relatively thereto, the tubular spindle, the clutch carried thereby, the tapering screw-stem on the clutch, the clamping-ring screwed thereon, and the tubular counterbored chisel-ended cutter-stock working close to the rolls to prevent bending or flexing of the rod or blank.

4. The combination, substantially as hereinbefore set forth, of the housing, grooved feed-rolls adjustably mounted therein, the head-stock, a tubular spindle mounted therein, a counterbored cutter secured to the tubular spindle, a longitudinal screw-shaft gearing with the feed-rolls, gearing between the hollow cutter-carrying spindle and the longitudinal screw-shaft, a transverse screw-shaft mounted on the head-stock, a pivoted supporting-arm for the longitudinal screw-shaft, and a screw-block connected to said arm and operatively connected with the screw-shaft.

5. The combination, substantially as hereinbefore set forth, of the adjustable annularly-grooved feed-rolls, the head-stock adjustable relatively to the rolls, the tubular spindle, its clutch and clamping-ring, the tubular cutter-stock clamped therein, the driving-pulley on the spindle, the pinion on the end of the spindle, gearing connecting it with the longitudinal screw-shaft, and a worm-wheel on the upper feed-roll.

In testimony whereof I have hereunto subscribed my name.

ROBERT PORTER FRIST.

Witnesses:
THOMAS GIFFIN,
HERMANN E. FRIST.